April 7, 1959   M. A. FRENKEL ET AL   2,880,539
DECAL STAMPING MACHINE
Filed Feb. 2, 1956   5 Sheets-Sheet 3
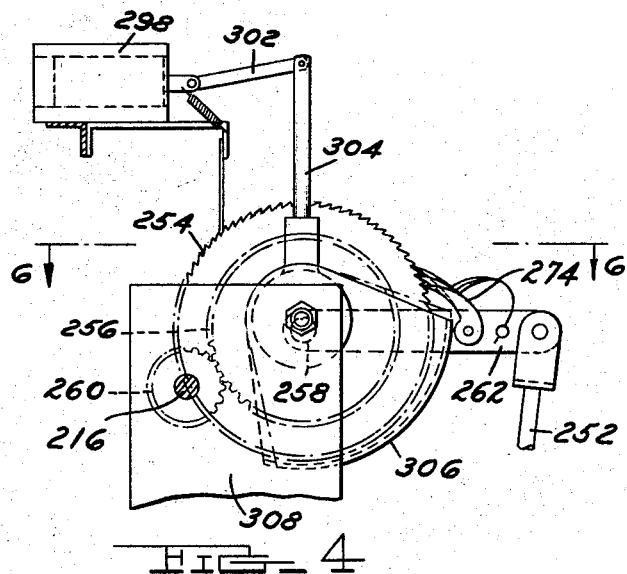
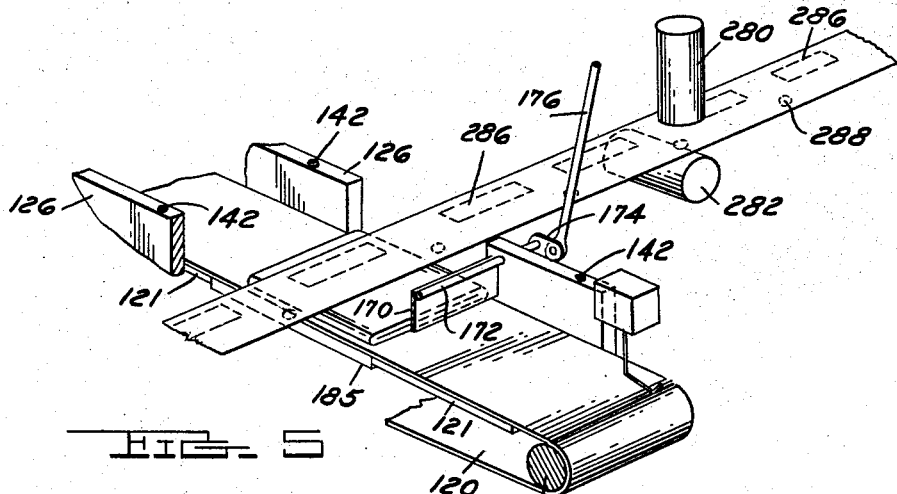
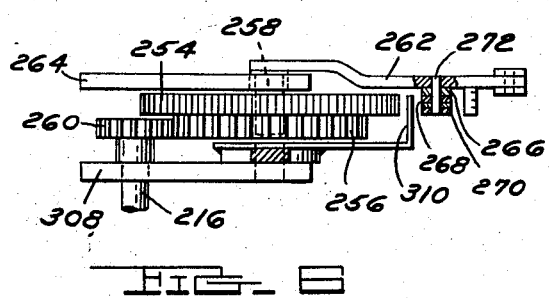
INVENTORS
MARVIN A. FRENKEL
HARRY R. FRANKLE
BY RALPH M. BURTON
Burton & Parker
ATTORNEYS

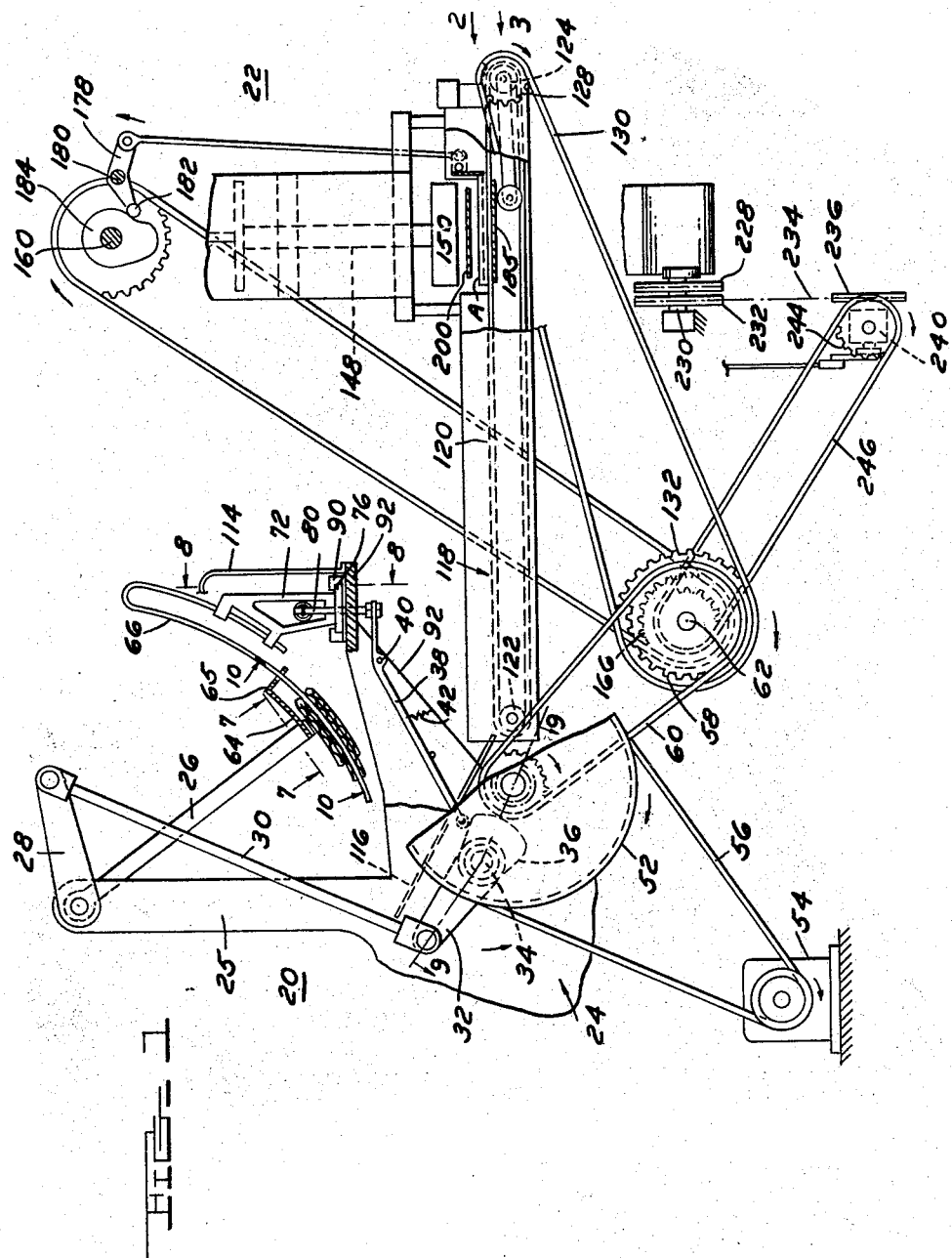

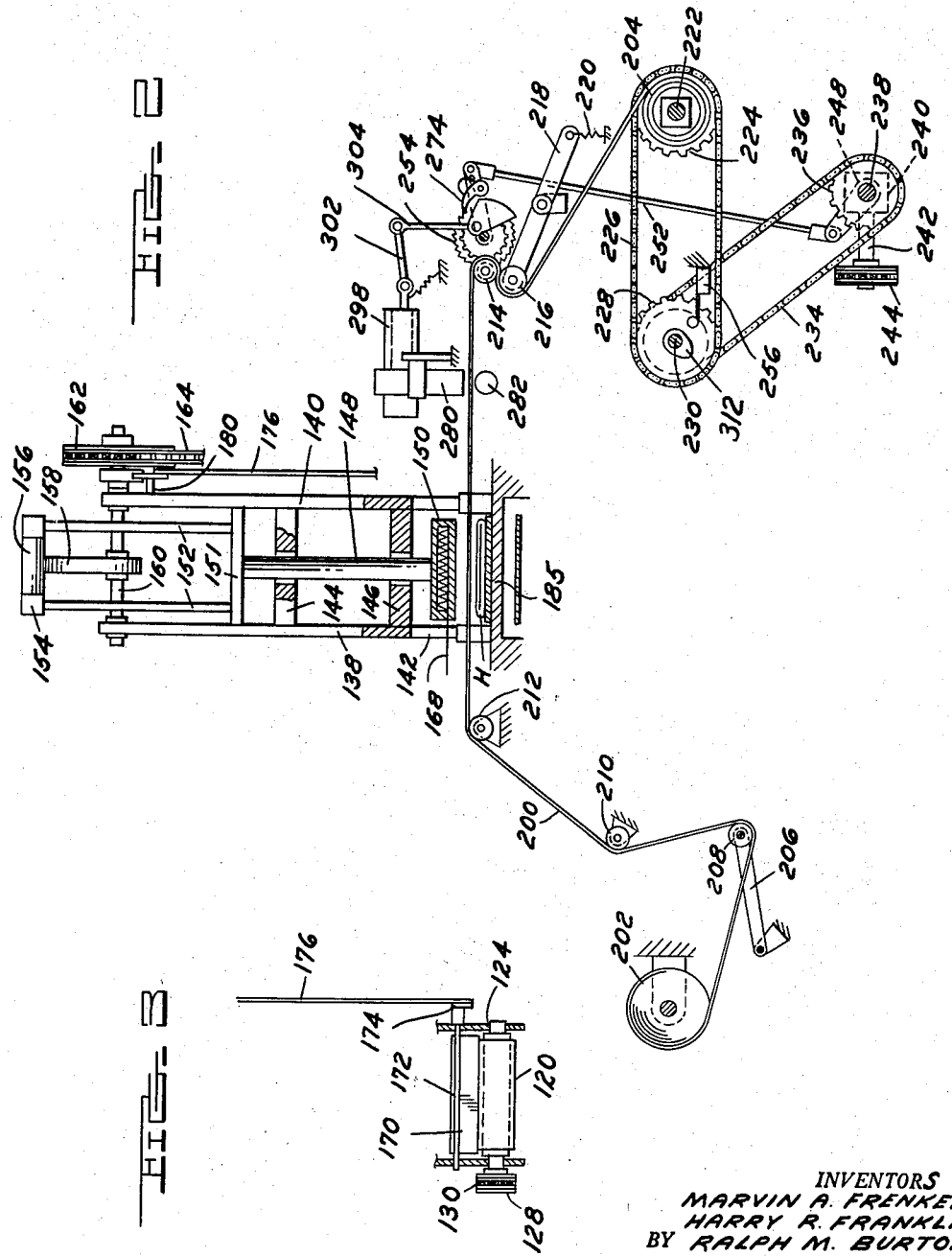

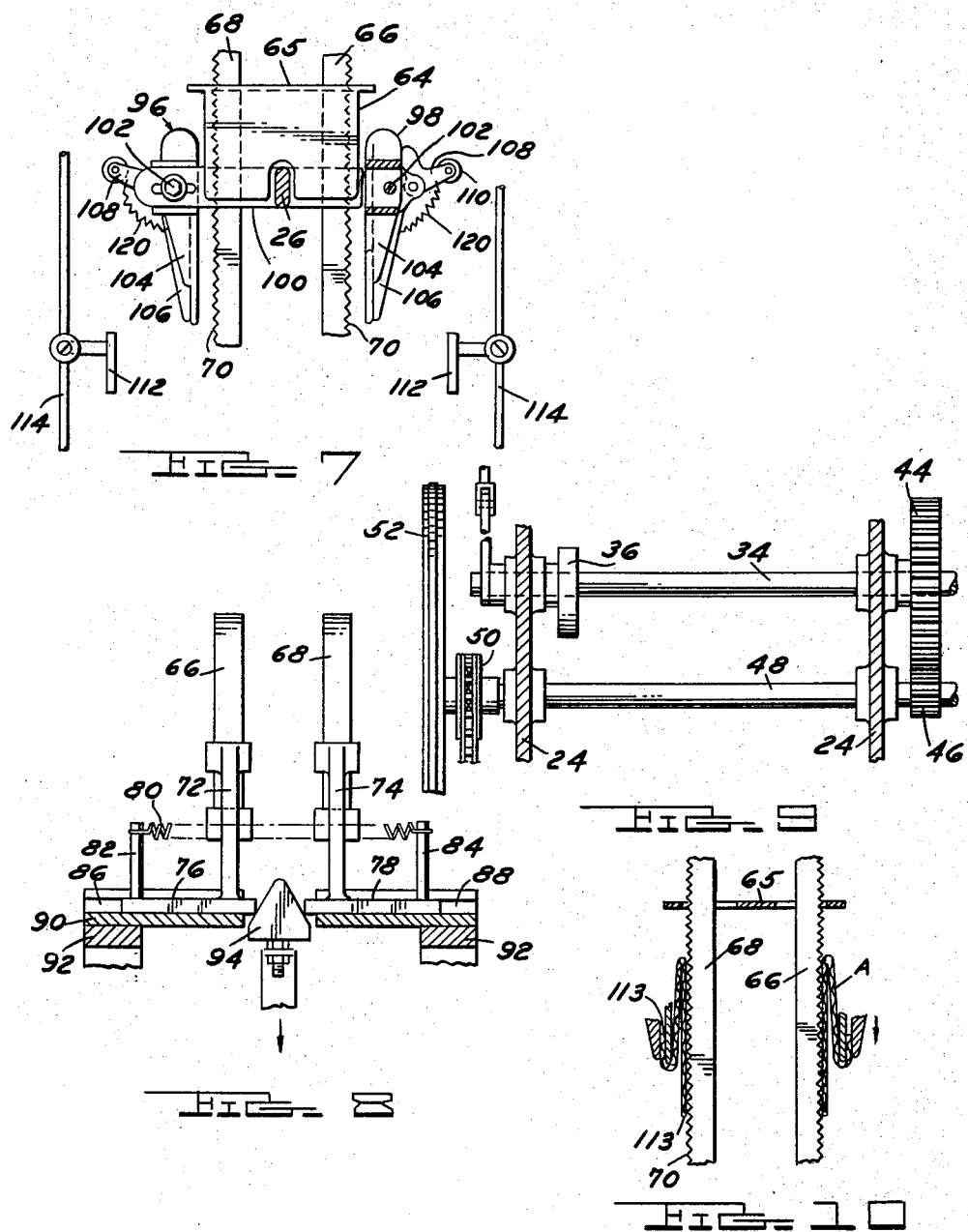

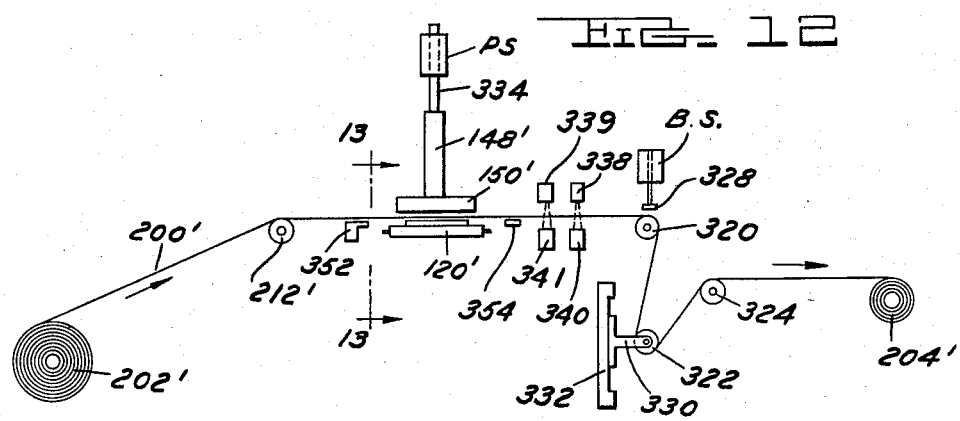
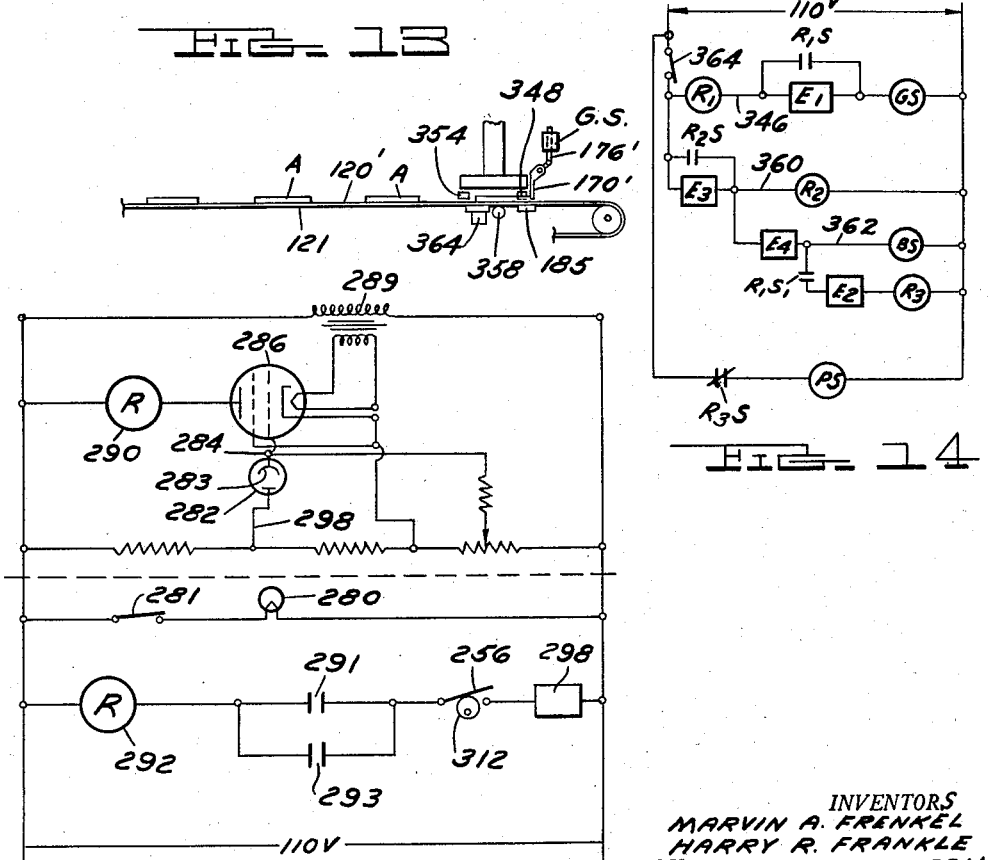

United States Patent Office 2,880,539
Patented Apr. 7, 1959

2,880,539
DECAL STAMPING MACHINE

Marvin A. Frenkel, Huntington Woods, Mich., Harry R. Frankle, Des Moines, Iowa, and Ralph M. Burton, Detroit, Mich.; said Burton assignor to said Marvin A. Frenkel Application February 2, 1956, Serial No. 563,020

10 Claims. (Cl. 41—1)

This invention relates to a decalcomania transfer or stamping machine and particularly to a machine for automatically transferring or stamping decalcomania from a carrier ribbon to a succession of articles moving along a conveyor.

The invention is shown as embodied in a device for imprinting decalcomania upon a succession of glove cuffs as they are discharged from a cuff-forming machine. However, it will become apparent that the invention may be readily adapted to many other machines for imprinting cloth or the like articles formed thereby, and I do not wish or intend to limit its application to cuff-forming machines.

The invention is particularly well suited for use in an automatic article-handling system to serve to stamp and desired marking, such as a trademark, on articles passing through the system. In carrying out the invention each article of a succession of articles moving along on an article conveyor is imprinted with a decalcomania, hereinafter termed a decal, from a decal carrier ribbon traveling above the article conveyor. Means are provided for heating and pressing successive decals on the ribbon against successive articles on the conveyor. Other means are provided for registering a decal on the ribbon with the means serving to heat and press the decal against the article. Means are provided for interrupting the travel of that article on the conveyor to be stamped, and at the time of stamping, the means for heating the decals serves to interrupt the movement of the conveyor during the transfer. Following the transfer of the decal the conveyor is again started, and the imprinted article permitted to move on the conveyor toward the next handling operation.

An object of the invention is the provision of an automatic decal stamping or transfer machine provided with an article conveyor upon which articles are successively fed into a stamping or transfer station, with the station having a movable heated platen therein beneath which and between which and articles on the conveyor a decal tape or ribbon passes, with means for timing the operation of the platen with the positioning of an article in the station, to effect downward movement of the platen against the tape to carry the tape against the article to stamp the article in the station.

Another object of the invention is the provision of means to time the movements of the decal tape and platen such that prior to the stamping operation of the platen a decal on the tape is properly positioned thereunderneath.

Another object of the invention is the provision of means for interrupting the movement of an article on the conveyor and holding the article arrested during the stamping operation, and thereafter releasing the article for continued movement on the conveyor.

Another object of the invention is the provision of means coupled with the tape for intermittently driving the same, and which means includes a decal position-sensing device of such character that the improper positioning of a decal beneath the platen is detected and corrected when succeeding decals are positioned beneath the platen.

Another object of the invention is the provision of means for actuating the heated platen such that the movement of the platen toward articles on the conveyor is by force of gravity. A concomitant object of the invention is the provision of a slip clutch drive for the conveyor with the weight of the platen on an article on the conveyor being sufficient to exceed the frictional limitation of the clutch and thereby interrupt movement of the conveyor.

Other objects, advantages, and meritorious features will more fully appear from the specification, claims, and accompanying drawing, wherein:

Fig. 1 is a side semi-diagrammatic view of a glove cuff forming machine showing our decal imprinter coupled thereto;

Fig. 2 is an end view, partially in section, and with parts removed for clarity, of our decal imprinter looking in the direction of arrow 2 of Fig. 1;

Fig. 3 is an end view, partially in section, of the article conveyor looking in the direction of arrow 3 in Fig. 1;

Fig. 4 is a detailed view of the decal ribbon position-correcting mechanism shown generally in Fig. 2;

Fig. 5 is a perspective view showing the relationship between the article conveyor and the decal ribbon at their point of intersection;

Fig. 6 is a cross sectional view taken on the line 6—6 of Fig. 4;

Fig. 7 is a cross sectional view taken on the line 7—7 of Fig. 1;

Fig. 8 is a cross sectional view taken on the line 8—8 of Fig. 1;

Fig. 9 is a cross sectional view taken on the line 9—9 of Fig. 1;

Fig. 10 is a cross sectional view taken on the line 10—10 of Fig. 1;

Fig. 11 is a schematic view of the electric control circuit of our decal imprinter;

Fig. 12 is a schematic view of a modification of our stamping machine;

Fig. 13 is a view taken along the line 13—13 of Fig. 12; and

Fig. 14 is a schematic view of the electric circuit of the modification shown in Figs. 12 and 13.

A cuff-forming machine 20, with which our improved decal imprinter 22 is illustrated as being coupled, is shown in part schematically in Fig. 1 with certain parts thereof shown in greater detail in Figs. 7–10. The cuff-forming machine is illustrated for the purpose only of showing a part of an article-handling system which serves to supply a succession of articles to be fed into our improved decal imprinter. The cuff-forming machine is shown in detail in U.S. patent of Greeson, No. 1,154,581, issued September 27, 1915.

Cuff-forming machine

The cuff-forming machine 20 includes a frame 24, shown in Figs. 1 and 9, to an upstanding portion 25 of which is pivotally connected an angularly downwardly extending arm 26. A lever 28 connected to the upper end of arm 26 is adapted to pivot the arm in an arcuate motion. The outer end of lever 28 is connected by means of a rod 30 to a lever 32 mounted on a shaft 34 which is supported in the frame 24. Mounted on shaft 34, to rotate therewith, is a cam 36 shown in Fig. 9, adapted to actuate one end of the arm 38, pivoted as at 40 to the frame 24. A spring 42 is connected to rocker arm 38 and to the frame to tension the arm downwardly as shown in Fig. 1. Also mounted upon shaft 34 at that end thereof opposite the crank 32 is a gear 44 adapted to mesh with a pinion gear 46 mounted on shaft 48.

Shaft 48 is supported in the frame 24. At the opposite end of the shaft from pinion gear 46 are a pair of chain sprockets or the like 50 and 52. Entrained over sprocket 52 and connected to an electric motor or the like 54 is a drive chain 56. The electric motor 54 is adapted to drive sprocket 52 in the direction of the arrow in Fig. 1. Entrained over sprocket 50 and connected to sprocket 58 is a chain drive 60. Sprocket 58 is mounted on shaft 62 which may be supported in any convenient manner in the frame of our improved decal imprinter, and forms a part of our imprinter. It is apparent that upon rotation of pulley 52, sprocket 58 will be driven in the direction of the arrow in Fig. 1.

Connected to the lower end of rod 26, as shown in Figs. 1 and 7, is a generally L-shaped bracket 64, the depending leg 65 of which is slotted to be received over the arcuately shaped cuff guide arms 66 and 68 which are serrated along their outer edges as at 70. The depending leg 65 is adapted to travel over guides 66 and 68 and serves to urge a glove cuff therealong as hereinafter described.

The arcuately shaped cuff guide arms 66 and 68 are mounted upon a pair of upstanding brackets 72 and 74. The brackets are mounted upon a pair of slidable plates 76 and 78 which are tensioned toward each other by a spring 80, the opposite ends of which are connected to upstanding pins 82 and 84 mounted respectively upon plates 76 and 78. The plates 76 and 78 are carried for slidable movement in guideways 86 and 88 formed in a member 90 which rests upon the laterally extending portion 92 of frame 24. Because the arcuate cuff guide arms are mounted on slidable plates 76 and 78, they may be shifted laterally toward and away from each other.

To effect the shiftable movement of the cuff guide arms, a wedge-shaped cam 94 is mounted upon the end of rocker arm 38. As cam 36 on shaft 34 revolves, the lower end of rocker arm 38 is raised and lowered, thereby effecting a reciprocating motion of cam 94 and causing the slide plates 76 and 78 to be moved toward and away from each other. Cam 94 serves to wedge the plates apart. Upon withdrawal of the cam, spring 80 serves to move the plates toward each other and effect a closing of arms 66 and 68. As shown in Fig. 10, the slots in depending leg 65 of the L-shaped member 64 are of such lateral dimension that opening and closing of arms 66 and 68 is permitted.

Not shown, but lying to the left of upstanding portion 25 of frame 24, as viewed in Fig. 1, is a tubular cuff stock receiving guide and a cuff-shearing mechanism, and more particularly described in said Greeson patent. The cuff guide and shearing mechanism serve to receive a length of tubular cuff stock and shear the same at spaced apart points to form lengths of tubular cuff material. These lengths of tubular cuff material are formed one after another and are picked up immediately after formation and drawn over guide arms 66 and 68. In order to engage the tubular cuff stock and draw it over the guide arms 66 and 68, and also to effect a folding of the stock to form a folded cuff of double thickness, a pair of cuff-engaging finger assemblies 96 and 98 is provided at the lower end of rod 26. Such assemblies are shown in Figs. 7 and 10 at 96 and 98 and are mounted upon opposite ends of a laterally extending member 100 connected to rod 26 immediately below the L-shaped member 64.

The finger assemblies are mounted on member 100 by means of bolts or the like 102. Each finger assembly includes a pair of cooperable fingers 104 and 106. Fingers 104 are fixed while fingers 106 are pivotable laterally with respect to fingers 104.

In order to effect pivotal movement of fingers 106 of each pair 96 and 98, laterally extending cam followers 108 having rollers 110 at their outer ends are pivoted as at 111 to the finger assembly. The rollers are adapted to abut cams or guides 112 mounted on frame portions 114 of the machine. As viewed in Fig. 7, upon movement of the rod 26 downwardly, the rollers 110 of the cam followers will engage cams 112 and cause fingers 106 to pivot laterally outwardly from fixed fingers 104. A pair of cams similar to cams 112 and disposed farther downwardly along frame portions 114 as viewed in Fig. 7, are so disposed as to open the fingers when the arm 26 is at the lower end of its arcuate movement, and at this instant, the leading edge of a piece of tubular cuff stock is presented to the fingers by the cuff-shearing and guiding mechanism located to the left of upstanding portion 25 of frame 24. Upon reversal of movement of arm 26 the fingers draw the tubular stock with them up over the guide arms 66 and 68 and when the fingers reach the upper limit of their travel, the guide arms are opened by means of wedge cam 94 being inserted between plates 76 and 78. The serrated edges 70 of guides 66 and 68 engage the cuff stock, indicated at A, as shown in Fig. 10, and upon reversal of movement of arm 26 the cuff is folded downwardly upon itself to form a cuff of double thickness. When the cuff has been folded to the extent approximately shown in Fig. 10, the rollers 110 of the cam followers 108 again engage cams 112 shown in Fig. 7 and the fingers are opened. Fingers 104 continue to move downwardly over the tubular stock and complete the fold of the edge of the stock theretofore gripped between the fingers. When the edges 113 of the stock are in alignment such that the cuff has been completed folded, the guides 66 and 68 are closed, i.e., retracted away from the sides of the tubular stock. The depending leg 65 of member 64 thereupon engages the cuff A and urges the same off of the guides 66 and 68, and the cuff drops into the chute 116 shown in dotted outline in Fig. 1. Upon falling into chute 116 the cuff then slides down to the conveyor 118. The finger assemblies 96 and 98 continue their movement and pick up the next piece of tubular cuff stock and the operation is repeated. A spring or the like 120 may be connected between cam followers 108 and fixed fingers 104 to normally tension the fingers together.

The cuff-forming machine hereinabove generally described serves to deposit, in the manner mentioned, a succession of glove cuffs in chute 116, from which the cuffs descend to the conveyor 118. With the cuff-forming machine operating at a constant speed, a cuff is deposited in chute 116 at determined time intervals and as a consequence, cuffs are deposited at the intake end of conveyor 118 at determined intervals.

While I have hereinabove referred to a cuff-forming machine which deposits glove cuffs at determined time intervals at the intake end of conveyor 118, it is to be understood that many other types and varieties of machines may be provided at the intake end of conveyor 118 to deposit articles upon the conveyor at determined time intervals. It is necessary only to ensure that the articles to be imprinted by our improved imprinter hereinafter mentioned are deposited with determined regularity upon the intake end of the conveyor. Because shaft 62 is connected to the cuff-forming machine by means of gear train 60, the speed of rotation of shaft 62 is a function of the rate at which cuffs are deposited in chute 116 and thence find their way to conveyor 118. Because the rotation of shaft 62 is a function of the speed at which the glove cuffs are deposited on conveyor 118, shaft 62 provides a means for synchronizing the operation of our improved imprinter with the rate of deposit of the glove cuffs on conveyor 118.

*Conveyor*

Conveyor 118 is one of the elements of the combination comprising our improved decal stamping or transfer machine. The conveyor includes an endless belt or the like 120 entrained over rollers 122 and 124 at opposite ends of the imprinter. A conveyor floor 121 extends beneath the upper span of belt 120. A pair of conveyor guide walls 126 are disposed along opposite sides of the belt 120 and the rollers may be mounted between the side walls after the manner shown in Fig. 3. Roller 124 is connected to a gear 128 over which is entrained the drive chain 130 which extends to gear 132 mounted on shaft 62. Gears 128 and 132 are so proportioned relative to each other that the conveyor is driven at a speed such that as each glove cuff is deposited at the intake end of the conveyor, it is promptly drawn by the conveyor away from the intake end and toward the transfer or stamping station of our machine. Roller 124 may have a conveyor belt engaging surface which will readily slip relative to the belt such that upon holding the belt against movement the roller will continue to rotate. The purpose of this will be described hereinafter.

*Stamping station*

The stamping station includes a pair of upstanding laterally spaced apart side frame members 138 and 140 supported at the lower ends on four posts 142 received within the conveyor guide walls 126. The side members 138 and 140 are held in spaced apart relation by transversely extending members 144 and 146. Members 144 and 146 are provided with aligned apertures therethrough through which extends a downwardly projecting platen-carrying rod 148 with a platen 150 mounted on the lower end thereof.

The upper end of rod 148 is connected to a cross head 152 adapted to reciprocate between the side members 138 and 140. The cross head is provided with a pair of spaced upwardly extending members 152 the upper ends of which are connected together by a cam follower 154 having a roller portion 156. The roller is adapted to bear against a cam 158 mounted on a shaft 160 which extends between and is carried by members 138 and 140. Shaft 160 is driven by a sprocket 162 mounted on one end thereof with a chain drive 164 entrained over sprocket 162 and extending downwardly and entrained at its lower end over sprocket 166 which is mounted on shaft 62. Upon each complete revolution of sprocket 162 the cross head 151 and consequently platen 150 is reciprocated. It will be noted that platen 150 descends by virtue of gravity and that cam 158 in no way acts to force the platen downwardly. Suitable wiring schematically indicated at 168 is adapted to heat the platen.

Included in the stamping station is a cuff gate 170 which is mounted on a shaft 172 extending between and supported by conveyor guide walls 126, with one end of the rod projecting beyond one of the guide walls and provided with a crank 174. A connecting rod 176 extends from crank 174 upwardly to a cam follower 178 pivotally mounted on support 180. Support 180 is affixed to side member 140 of the stamping station. The roller 182 on the end of cam follower 178 is adapted to follow a cam 184 mounted on shaft 160. Upon each complete revolution of cam 184 the gate 170 is swung from a vertical position in which it is disposed as shown in Fig. 5 to arrest movement of a cuff on the conveyor belt 120, to a horizontal position in which it is disposed to permit a cuff on conveyor belt 120 to pass therebeneath and out of the stamping station.

Disposed beneath the upper span of belt 120 and in alignment with the platen is a floor plate 185 secured between the conveyor guide walls 126. Upon dropping of the platen toward a cuff on the conveyor, the weight of the platen resting upon the cuff grips the belt 120 against the plate 185 with sufficient force to stop the travel of the conveyor belt. The feed roller 124 of the conveyor continues to rotate but slips within the belt. With the belt held motionless the travel of succeeding cuffs toward the stamping station is thereby interrupted.

It is now apparent that the gate 170 initially stops movement of a cuff to be stamped by holding the cuff in the stamping station, and that after descent of the platen the cuff is held, as well as the conveyor belt and succeeding cuffs, from advancing until the platen is raised. The position of cam 184 on shaft 160 is such that the gate 170 is raised immediately before ascent of the platen or at the time of ascent of the platen so that when the platen is raised the stamped cuff is promptly conveyed out of the station. The right hand end of the conveyor may be disposed to deliver the cuffs to the next succeeding station in the cuff-handling system.

*Decalcomania ribbon-supporting and advancing mechanism*

As shown in Figs. 1 and 2, mechanism is provided for supporting and advancing a waxed decalcomania ribbon or tape 200 of conventional construction between the heated platen 150 and articles A disposed on the conveyor 118. The mechanism includes a feed roll 202 of ribbon stock and a take-up roll 204. Intermediate these two rolls are a plurality of guide rollers and means for feeding the ribbon in a step-by-step movement with a pause following each step. Indicated at 206 is a ribbon-tensioning arm provided with a roller 208, with the weight of the roller and arm serving to tension the ribbon as shown in Fig. 2. A pair of guide rollers 210 and 212 guide the ribbon upwardly and permit feed thereof over the conveyor. Feed roller 214 mounted on shaft 216, see Fig. 6, receives the tape from that side of the stamping station opposite guide roller 212. Roller 214 may be covered with rubber or the like to increase the coefficient of friction between the ribbon and the roller. A tensioning roller 216 mounted on the end of pivotally supported arm 218, with a spring 220 tensioning the roller upwardly and against tape 200 to squeeze the tape between rollers 214 and 216, serves to increase the friction of the ribbon about roller 214.

The take-up roll 204 is mounted upon a shaft 222 which is supported by a friction clutch drive arrangement of conventional construction whereby a limited torque is applied to roll 204, such that if the ribbon resists take-up movement of roll 204 beyond a predetermined force, the clutch mechanism will serve only to keep the ribbon taut, and when the resistance against take-up of ribbon 200 drops below the predetermined torque load of the clutch, take-up roll 204 will serve to wind the ribbon on the roll. Sprocket 224 is mounted on the clutch mechanism and driven by chain drive 226 entrained at the end opposite sprocket 224 over sprocket 228 mounted on shaft 230.

As shown in Fig. 1, a sprocket 232 is also mounted on shaft 230 to be driven by chain drive 234 entrained at its opposite end over sprocket 236. Sprocket 236 is mounted on shaft 238 which extends into the gear box 240. Also extending into gear box 240 is shaft 242 upon the outer end of which is mounted sprocket 244. A chain drive 246 connects sprocket 166 on shaft 62 to sprocket 244, as shown in Fig. 1. The gear box 240 serves to translate the drive of shaft 242 to the angularly related shaft 238 and impart motion to the latter.

A crank 248 is mounted on shaft 238 and is connected directly to actuating rod 252. Rod 252 extends upwardly to a gear train for intermittently feeding the decal ribbon 200. Such gear train includes a large ratchet gear 254 together with a smaller gear 256 both of which are mounted on a common shaft 258. Gear 256 meshes with a gear 260 mounted on shaft 216.

In order to drive the gears 254, 256, and 260 from actuating rod 252, a ratchet lever is pivotally connected at its outer end to rod 252 and at its inner end to a laterally projecting portion 264 of the frame of our decal transfer machine. Mounted on the lever 262 are three pivoted fingers or ratchet pawls 266, 268, and 270. The fingers are supported on the common pin 272. Three springs generally indicated at 274 are connected to the fingers and to the lever as shown in Fig. 4 and serve to tension the fingers toward gear 254.

Upon rotation of shaft 238, actuating rod 252 is raised and lowered. When lever 262 is swung upwardly, it serves to engage the fingers 266, 268, and 270 with the teeth of gear 254 to turn the gear in a counterclockwise direction as viewed in Figs. 2 and 4. As rod 254 is moved downwardly, lever 262 is pivoted downwardly and the fingers mounted thereon drag over the teeth on gear 254, and gear 254 remains stationary. In this fashion an intermittent movement is imparted to tape 200. Such movement is in timed relation with the operation of the cuff-folding machine generally indicated at 20 in Fig. 2, such that the movement of the ribbon is interrupted periodically and at such times as correspond with the movement of a cuff A on conveyor belt 120 into the stamping station. Such timed movement of the step-by-step feed of ribbon 200 with the movement of cuffs on the conveyor, however, does not ensure that a decal on the ribbon will be properly positioned over a cuff in the stamping station at the time of descent of the heated platen 150. Means are provided for properly positioning the ribbon such that the decals on the tape are positioned immediately above and in registry with a cuff on the conveyor in the stamping station, and in registry with the heated platen.

*Decal positioning means*

As shown in Figs. 4, 5, 6, and 11, means are provided for properly aligning the decalcomania on the ribbon 200 with a cuff in the stamping station prior to the downward movement of the heated platen to transfer the decal to the cuff. Such means includes a decal position-sensing device comprising an exciter lamp 280 and a photoelectric cell 282 shown in Figs. 5 and 11. Lamp 280 is focused toward cell 282 with sufficient light passing through ribbon 200 to energize the light-sensitive surface 283 in cell 282. The ribbon 200 is provided, as shown in dotted outline in Fig. 5, with a succession of decals 286 positioned at spaced apart intervals along the length of the ribbon, and is also provided with a succession of opaque dots 288 positioned intermediate the decals. The light from lamp 280 of the sensing device is adapted to pass through the ribbon except when an opaque dot 288 is disposed immediately below portion 280, in which event light does not reach the photo-sensitive surface 283.

A conventional photoelectric system is provided in which the lead 284 is connected to the grid circuit of an amplifier tube 286, and the plate of the photo cell is connected to the cathode circuit of the tube 286 by lead 288. Lamp 280 is connected to a source of current, as, for example, 110 v. A.C., through an "Off-On" switch 281, and the heater circuit for tube 286 is connected to a transformer 289 connected in the 110 v. A.C. supply. The plate of tube 286 is connected to relay 290 which actuates normally closed switch 291.

Switch 291 is in a 110 v. circuit in which a second relay solenoid 292 is in series with switch 291, and a normally open switch 293, operated by relay 292, is in parallel with switch 291. A solenoid 298 is connected in this 110 v. circuit. Solenoid 298 shown in Figs. 2, 4, and 11, is connected by link 302 to the upper end of arm 304 which is connected at its lower end to the finger shield 306. Finger shield 306 is pivotally connected to portion 308 of the stamping machine. The shield is arcuately shaped with a portion 310 overlying somewhat less than 90° of the teeth of gear 254. Upon energization of solenoid 298 to draw the plunger therewithin, the shield is rotated slightly from the solid outline position of Fig. 4 to the dotted outline position.

Upon movement of the shield from the solid to the dotted outline position, the fingers 266, 268, and 270 are not permitted to engage the teeth of gear 254 as early during the upward movement of lever 262 as they would if shield 306 was in the solid outline position. This is so for the reason that the shield holds the fingers outwardly away from the teeth of gear 254 until the fingers have passed beyond the upper edge of the shield and can spring toward the teeth of gear 254. The tip of each of the fingers is spaced from the next adjacent finger tip by an amount substantially one-third of the distance between adjacent teeth on the gear. For this reason, as soon as the fingers have passed over the upper edge of shield 306, one of them will immediately engage behind one of the teeth of gear 254 and without lost motion between lever 262 and gear 254, the gear will be rotated. The provision of three fingers instead of just one eliminates the necessity of cutting three times as many teeth in gear 254.

With the solenoid 298 energized and the shield urged around counterclockwise to its dotted outline position, it is apparent that the amount of rotation imparted to gear 254 upon the upward swinging of lever 262 is not as great as would occur if shield 306 were in the solid outline position. For this reason not as much ribbon will be wound between feed rolls 214 and 216 and therefore the ribbon will not be moved as far as would otherwise occur if shield 306 was in the solid outline position.

The operation of this decalcomania-positioning mechanism is as follows. The ribbon is driven in a step-by-step movement by the lever 248 and connecting rod 252 which move in timed relation with the deposit of articles on the conveyor by virtue of being connected to the drive shaft 62 which turns in synchronism with the cuff-forming machine. However, because there is no assurance that a decalcomania on the ribbon is properly positioned between the heated platen and a cuff on the conveyor, the positioning means heretofore described is provided, and as a decal 286 on the ribbon approaches the platen and a position of proper alignment with the platen, an opaque dot 288 also approaches the light beam emanating from exciter lamp 280 of the sensing device. If the pauses following each step of intermittent feed of ribbon 200 occur when the decal 286 is properly aligned with the platen, the opaque dot 288 will not have as yet reached the light beam from lamp 280 of the sensing device, and as a result the photosensitive surface in cell 282 will remain energized and will maintain a negative charge on the grid of tube 286. This charge will repel the flow of electrons from the cathode to the plate of tube 286 and no current will flow through the relay 290. With no current flowing through this relay, relay switch 291 remains open and solenoid 298 remains inoperative.

However, if a decalcomania 286 on ribbon 200 should pass beyond a position of proper alignment with the platen before the movement of ribbon 200 is interrupted, the opaque dot 282 will interrupt the light beam from lamp 280 and thereupon the grid in tube 286 will cease to repel electrons and current will flow through relay 290 closing switch 291 thereby serving to energize solenoid 298 and relay 292. Upon energization of relay 292, its switch 293 is closed serving to maintain the circuit to solenoid 298 closed after switch 291 opens when relay 290 is de-energized. Upon energization of solenoid 298 the shield 306 will be rotated to the dotted outline position and upon the next succeeding movement of the ribbon 200, its movement will not be as great. In other words, the decal next approaching the platen will not be moved as far as was the previous decal. In this fashion the position of decalcomania on the ribbon is properly aligned with the platen by correcting the amount of movement of ribbon 200 so that the movement thereof is interrupted at the time that a decal is properly positioned beneath the platen. Solenoid 298 is de-energized following the engagement of fingers 266– 270 with the teeth of gear 158 by cam 312 opening switch 256.

In the event that the recals are properly positioned beneath the platen without correction by the positioning means, as the opaque dots 288 interrupt the light beam following each stamping operation and therefore tend to energize solenoid 298, the cam 312 opens switch 256 and breaks the circuit to solenoid 298.

It is now apparent that the above-described embodiment of our invention functions in timed relation with the operation of the cuff-folding machine and therefore in timed relation with the deposit of cuffs on the conveyor. With the speed of the conveyor being predetermined such that a cuff is presented to the stamping station immediately prior to a stamping operation, the presence of a cuff in the stamping station at the time of the stamping operation is assured if the cuff-forming machine is functioning properly to deposit cuffs on the conveyor at constant intervals.

It is also apparent that the movement of a cuff into the stamping station is arrested by the gate 170 and that during the stamping of the cuff, the movement of the conveyor is interrupted by the weight of the heated platen. It will also be recalled that the descent of the heated platen occurs by virtue of its own weight. As a consequence, if more than one cuff should enter the stamping station at the same time, there will be no damage to the ribbon 200 by having the platen forced against the cuffs as would occur if a positive direct drive between the platen and the cam 158 were employed.

It is also to be noted that while the intermittent feed of the ribbon 200 is synchronized with the operation of the platen and the cuff-forming machine, the movement of the ribbon is modulated by the sensing device to decrease, when necessary, the distance the ribbon moves during its step-by-step movement, thereby to ensure alignment of the decals on the ribbon with the heated platen.

*Modification*

In Figs. 12–14, we have schematically shown a modification of the hereinabove described decal stamping machine. Such modification is similar to the above-described machine except as hereinafter described. Reference numerals are primed when indicating parts corresponding with previously described parts. In this modification the stamping of an article in the stamping station is made dependent upon the presence of an article in the stamping station in a position to be stamped, and the proper alignment of a decal on the transfer ribbon beneath the heated platen. When these two conditions are existent, an article is stamped. This differs from the aforementioned embodiment shown in Figs. 1–11 where the stamping is dependent upon the rate of operation of some other machine in the article-handling system, as, for example, a cuff-forming machine, and where the stamping may occur without regard to the actual presence of an article in the stamping station or a decal properly aligned beneath the platen.

In the embodiment shown in Figs. 12–14, the decal ribbon $200^1$ is advanced in a step-by-step manner with a pause following each step, and when the pauses in the intermittent feed of the ribbon occur, a decal thereon is positioned immediately below the heated platen $150^1$. Articles A on conveyor belt $120^1$ move into the stamping station, and when an article is properly positioned in the stamping station, and a decal is positioned beneath the platen, the platen $150^1$ is lowered against the decal on the tape to carry the decal against the article to stamp the same. Unless there is an article in the stamping station in the proper position to be stamped, the platen will not be lowered. Similarly, if a decal on ribbon $200^1$ is not disposed immediately below platen $150^1$, the platen will not be lowered.

The decal transfer ribbon $200^1$ is fed from a supply roll $202^1$, as shown in Fig. 12, over a guide roll $212^1$ and between the heated platen $150^1$ and the conveyor belt $120^1$. The ribbon passes over a guide roller 320, beneath a tensioning roller 322, over a guide roller 324, and thence to the take-up roll $204^1$. The take-up roll $204^1$ is mounted on a slip clutch as hereinabove described.

The floor plate $185^1$ of the article conveyor is cut away as at 358, as shown in Fig. 13, immediately below the stamping station, for a purpose hereinafter mentioned.

Disposed immediately above guide roller 320 is a ribbon brake solenoid BS having a brake shoe 328 at the lower end of the plunger of the solenoid. Upon energization of solenoid BS the plunger is extended downwardly to force the shoe 328 against the ribbon and grip the ribbon between the shoe and roller 320 to interrupt movement of the ribbon. Upon sudden stoppage of the ribbon, the tension roll 322, mounted on bracket 330 which is freely slidable in a guideway formed in a portion 332 of the frame of the stamping machine, will rise and cushion the initial shock. While the ribbon is held motionless the slip clutch mounting take-up roll $204^1$ will slip.

The heated platen $150^1$ is mounted on the lower end of the rod $148^1$, the upper end of rod $148^1$ being connected, for example, to the plunger 334 of solenoid PS. When solenoid PS is energized, the platen $150^1$ is raised away from the conveyor, and when de-energized, the platen is free to fall by its own weight toward the conveyor.

The article gate $170^1$ is actuated by a solenoid GS connected to rod $176^1$. Upon energization of solenoid GS, the gate 170 is swung downwardly to prevent an article in the stamping station from leaving the station, and when de-energized, the gate is swung upwardly to permit the article to pass out of the station.

In order to effect energization of solenoids PS, GS, and BS, suitably arranged photoelectric cells are disposed adjacent the article conveyor and adjacent the decal transfer ribbon to effect the closure of certain switches in the electrical system connected to the solenoids. The control circuits for these photoelectric cells are not shown in detail for they are of conventional construction and arrangement. The control circuits are shown generally in Fig. 14 and indicated by the letters $E_1$, $E_2$, $E_3$, and $E_4$. Within each of these control circuits is a switch adapted to be closed when the photoelectric cells associated with such circuits are de-energized by the interruption of the light beam normally falling upon such cells. The schematic wiring diagram of Fig. 14 is adapted to furnish 110 v. current or the like to the control circuits and to the solenoids of PS and BS.

As an article A moves in Fig. 13 on the article conveyor belt $120^1$ from left to right, it first intercepts the light beam from an exciter lamp 352 focused on photoelectric cell 354. Photoelectric cell 354 is disposed at the entrance to the stamping station. The control circuit for cell 354 is indicated in Fig. 14 at $E_1$. Upon interruption of the light beam to cell 354 by an article on the conveyor, a switch in circuit $E_1$ is closed permitting the flow of current through lead 346. In series in lead 346 with control circuit $E_1$ is a relay solenoid $R_1$ and the gate solenoid GS. Relay solenoid $R_1$ and gate solenoid GS are energized upon the closure of the switch in control circuit $E_1$, and the gate $170_1$ is moved to a position to prevent the article from leaving the stamping station. Relay solenoid $R_1$ on being energized closes normally open relay switch $R_1S$ to effect the continuance of flow of electric current through solenoid GS after the control switch in control circuit $E_1$ has been opened by the passage of the article completely through the light beam from exciter lamp 352.

The article now in the stamping station approaches the gate $170^1$ and intercepts a light beam from an exciter lamp similar to exciter lamp 352, and which light beam is focused upon photoelectric cell 348. Cell 348 is connected to the control circuit $E_2$ shown in Fig. 14. Control circuit $E_2$ is in series with the relay $R_3$ whose normally closed relay switch $R_3S$ is in series with the platen solenoid PS. Upon the interruption of the light beam falling upon cell 348, a switch in circuit $E_2$ is closed. Such switch remains closed as long as the article A remains in the stamping station. The article is held in the stamping station by gate 170¹.

While the article is disposed in the stamping station in a position to be stamped, the platen 150¹ will not be lowered until a decal on the transfer ribbon 200¹ is properly aligned with platen 150¹. The opaque dots 288, hereinabove mentioned, are disposed to interrupt light beams emanating from exciter lamps 338 and 339 disposed along the path of travel of ribbon 200¹. Disposed below the translucent ribbon 200¹ and opposite lamps 338 and 339 are the photoelectric cells 340 and 341. The cells are spaced apart a distance such that an opaque dot on ribbon 200¹ will first intercept the light beam from lamp 339 and will thereafter intercept the light beam from lamp 338 before a succeeding dot intercepts the light beam from lamp 339. Cell 340 is positioned such that when an opaque dot intercepts the light beam from lamp 338, a decal on ribbon 200¹ will be properly positioned beneath heated platen 150¹.

Assuming that the ribbon brake solenoid BS is de-energized and that therefore brake shoe 328 is raised from ribbon 200¹, the ribbon will move in the direction of the arrows shown in Fig. 12. The slip clutch, supporting take-up roll 204¹, may be driven by any suitable source of power, such as an electric motor, not shown. An opaque dot on ribbon 200¹ approaches the light beam from lamp 339 and intercepts the beam, de-energizing photoelectric cell 341. Upon de-energization of cell 341 control circuit $E_3$ connected thereto closes a switch in the circuit and permits the flow of electric current through lead 360 to relay solenoid $R_2$ and also to the control switch of control circuit $E_4$. Relay solenoid $R_2$ is connected to relay switch $R_2S$ which is connected in parallel with control circuit $E_3$. After the opaque dot has passed completely through the light beam from lamp 339, the relay switch $R_2S$ will maintain the flow of electric current through lead 360. The opaque dot now approaches and intercepts the light beam from lamp 338 thereby serving to de-energize the photo cell 340. Upon de-energization of cell 340, control circuit $E_4$, connected thereto, will close its control switch which will permit the flow of current through lead 362 in Fig. 14. Upon passage of current through lead 362, the brake solenoid BS, connected in series with control circuit $E_4$, will be energized. This will serve to move brake shoe 328 downwardly to grip ribbon 200¹ and interrupt the movement of the ribbon.

Switch $R_1S_1$ is operated by relay solenoid $R_1$ hereinabove mentioned, and is closed upon energization of relay solenoid $R_1$. With switch $R_1S_1$ closed and with current flowing through lead 362, the platen-actuating solenoid PS is de-energized by the opening of normally closed switch $R_3S$ in response to energization of relay $R_3$. This will permit the platen 150¹ to fall toward the decal ribbon and carry a decal thereon against the article in the stamping station.

A limit switch 364 is disposed within the cutout portion 358 of the floor plate 185¹ of the conveyor as shown in Fig. 13. As shown in Fig. 14, switch 364 is connected between the source of 110 v. current and the solenoids GS and BS and the various control circuits $E_1$–$E_4$. Switch 364 is a normally closed switch which is opened by the deflection of conveyor belt 120¹ under the weight of heated platen 150¹ resting against an article A disposed therebeneath and upon belt 120¹. When platen 150¹ descends to accomplish the decalcomania transfer to an article upon the belt, and with the platen resting upon the article, the belt is deflected downwardly in the cutout portion 358 of conveyor floor plate 185¹ to open switch 364 and interrupt the flow of current to relays $R_1$, $R_2$, and $R_3$. Upon interruption of current flow to relay $R_1$, relay switches $R_1S$ and $R_1S_1$ are opened and solenoid GS is energized. Upon de-energization of relay solenoid $R_2$, relay switch $R_2S$ is opened thereby interrupting the flow of current to solenoid BS. Thereupon the brake shoe 328 is raised from the transfer ribbon, the platen 150¹ is elevated, and the article gate 170¹ is swung upwardly away from a position holding an article beneath the platen to permit such article to pass out of the stamping station upon conveyor belt 120¹. The operation is thereafter repeated, with the next successive decal on the transfer ribbon and the next successive article on the article conveyor.

It is apparent that the decal stamping machine shown in Figs. 12–14 is not dependent for its operation upon the operation of other machines in the article-handling system, but is dependent directly upon the presence of an article in the stamping station, and the presence of a decal on the transfer ribbon immediately below the platen. Because of this, such machine may be readily inserted in an article-handling system without the necessity of connecting the machine to another machine in the system. In addition, the transfer machine will not move the platen toward the conveyor unless an article is disposed below the platen, nor will the platen be lowered unless a decal is properly positioned below the platen. For this reason the machine is particularly suited for use where articles on the conveyor do not approach the stamping station at uniform time intervals or which are not spaced apart at successive equal distances from one another.

It is apparent that various combinations and permutations of the primary embodiment and modification hereinabove described may be made without departing from the spirit of the invention.

What we claim is:

1. A decalcomania transfer machine comprising: an article conveyor; a heated platen disposed above the conveyor for movement toward and away from articles on the conveyor; decalcomania ribbon-actuating mechanism disposed to feed a decalcomania ribbon in a uniform step-by-step movement with a pause following each step, between the platen and articles on the conveyor, said mechanism including means for varying the length of each step-by-step movement; means coupled with the platen and with said mechanism and operable to move the platen toward and away from articles on the conveyor during the pause following each step-by-step movement of a decalcomania ribbon supported and advanced by said mechanism; a gate disposed adjacent the conveyor and swingable from a position interrupting movement of an article on the conveyor to a position permitting continued movement of the article on the conveyor; means coupling the gate with the first-mentioned means to synchronize the movement of the gate and platen; and sensing means coupled with said means for varying the length of each step-by-step movement of said mechanism and operable to sense misalignment with the platen of decalcomania on a ribbon supported and advanced by said mechanism, during each pause in the step-by-step advance of the ribbon, and initiate operation of said varying means to cause a variation in the length of the step-by-step feed thereby aligning succeeding decalcomania on the ribbon with the platen during subsequent step-by-step movements of the ribbon.

2. A decalcomania transfer machine comprising: an article conveyor; a heated platen disposed above the conveyor for movement toward and away from the conveyor; means coupled with the platen for actuating the same; means for guiding a decalcomania transfer ribbon between the platen and articles on the conveyor; ribbon-advancing mechanism including a feed roll over which a decalcomania ribbon may be entrained; a ratchet wheel coupled with the feed roll; a ratchet lever; mechanism coupling the lever with the means for actuating the platen to synchronize the movements thereof; a ratchet pawl mounted on said lever to engage the ratchet wheel;

means selectively operable to prevent engagement of the pawl and wheel during a portion of the movement of the lever; and means for sensing the position, relative to said platen, of decalcomania on a transfer ribbon, and coupled with the means for preventing engagement of the ratchet pawl, and operable upon sensing misalignment of decalcomania on the ribbon with respect to said platen to actuate said means for preventing engagement of the ratchet pawl to effect withholding of the pawl from the wheel during a portion of the movement of the lever.

3. A decalcomania transfer machine comprising: conveyor means for advancing a succession of articles to be stamped, a heated platen disposed above the conveyor for movement toward and away therefrom, means coupled with the platen for actuating the same, decalcomania transfer ribbon-advancing and supporting mechanism adapted to support a decalcomania transfer ribbon for movement between the platen and the conveyor and including means for effecting a step-by-step advance of the ribbon, ribbon-position correction means coupled with said means for effecting the step-by-step advance of the ribbon and operable to sense misregistry of decalcomania on the ribbon between the pauses in the step-by-step advance thereof and modulate succeeding operation of said mechanism until successive decalcomania on the ribbon are again in registry with the platen during the pauses in the step-by-step advance of the ribbon, and said means for actuating the platen coupled with said advancing and supporting mechanism to effect movement of the platen during the pauses in the step-by-step advance of the ribbon.

4. A decalcomania transfer machine comprising: an article conveyor including a conveyor belt and a slip clutch device for driving the belt; a heated platen disposed above the conveyor for movement toward and away therefrom and including means for raising the platen and permitting it to fall by gravity toward the conveyor; decalcomania transfer ribbon-supporting and advancing mechanism coupled with said means and operable in timed relation with the movement of the platen to feed a transfer ribbon in a step-by-step movement between the platen and articles on the conveyor; said platen being operable upon movement toward the conveyor to carry a ribbon supported by said mechanism against an article on the conveyor with the weight of the platen upon the article increasing the frictional force opposing the motion of the belt beyond the limiting friction of said clutch device to interrupt movement of the belt, and upon movement of the platen upwardly away from the belt the frictional force opposing movement of the belt being reduced below the limiting friction of the clutch device to permit continued movement of the belt.

5. A decalcomania transfer machine comprising: an article conveyor, a heated platen disposed above the conveyor and movable toward and away from articles thereon, decalcomania ribbon-supporting and advancing mechanism disposed to feed a decalcomania transfer ribbon between the platen and articles on the conveyor, first sensing means coupled with said mechanism and disposed adjacent a ribbon supported and advanced by said mechanism and operable to sense the presence of a decalcomania on the ribbon beneath the platen and simultaneously interrupt movement of the ribbon, a gate disposed adjacent the conveyor and movable from a position preventing movement of an article beneath the platen to a position permitting continued movement of an article from beneath the platen, means coupled with the gate for actuating the same, second sensing means coupled with the means for actuating the gate and disposed adjacent the conveyor and operable to sense the presence of an article on the conveyor when disposed immediately below the platen to initiate movement of the gate to a position interrupting movement of the article, and platen-actuating means coupled with the first and second sensing means and responsive to the simultaneous sensing thereby of the presence of a decalcomania and an article beneath the platen to move the platen against the ribbon and stamp the decalcomania upon the article on the conveyor.

6. A decalcomania transfer machine comprising: an article conveyor; a heated platen disposed above the conveyor for movement toward and away from articles on the conveyor; decalcomania ribbon-actuating mechanism disposed to feed a decalcomania ribbon in a step-by-step movement with a pause following each step, between the platen and articles on the conveyor in timed relation with the movement of articles on the conveyor; means coupled with the platen and with said mechanism and operable to move the platen toward and away from articles on the conveyor to stamp the platen against the ribbon over an article on the conveyor during the pause following each step-by-step movement of a decalcomania ribbon supported and advanced by said mechanism; and ribbon position correction means for sensing the position relative to the platen of decalcomania on a ribbon supported and advanced by said mechanism, said correction means coupled with the ribbon supporting and advancing mechanism and responsive to misalignment of a decalcomania on the ribbon with the platen during the pauses in the step-by-step advance of the ribbon to momentarily withhold operation of said mechanism to vary the amount of travel of the ribbon during succeeding step-by-step movements until the decalcomania on the ribbon are again aligned with the platen during the pause following each step-by-step movement of the ribbon.

7. A decalcomania transfer machine comprising: an article conveyor; a heated platen disposed above the conveyor for movement toward and away from the conveyor; means for guiding a decalcomania transfer ribbon between the platen and articles on the conveyor; a ribbon feed roll over which a decalcomania ribbon is entrained; means coupled with the feed roll for driving the same determined uniform increments in step-by-step rotation; modulating means coupled with the drive means for varying the uniform driving increments thereof; means for sensing the position, relative to said platen, of decalcomania on a transfer ribbon; and said modulating means coupled with the sensing means and responsive to the misregistry of decals with respect to the platen to vary uniformly subsequent drive increments of the driving means and correct the misregistry.

8. A decalcomania transfer machine comprising: an article conveyor, a platen disposed above the conveyor for movement toward and away from articles on the conveyor, means for guiding a decalcomania transfer ribbon beneath the platen for impression upon articles on the conveyor by the platen, a feed roll over which the transfer ribbon is entrained, drive means intermittently operable in synchronism with the movement of articles on the conveyor to index the feed roll a determined number of revolutions, clutch means between the drive means and the feed roll for coupling the drive means to the feed roll at the beginning of each operation of the drive means, sensing means coupled to the clutch means for sensing misregistry of decalcomania on the ribbon relative to the platen at the end of each indexing of the feed roll and operable to cause said clutch means to momentarily withhold coupling of the drive means to the feed roll at the commencement of the succeeding operation of the drive means to allow partial operation of the drive means before the same is coupled to the feed roll thereby reducing the amount of indexing of the feed roll.

9. A decalcomania transfer machine comprising: an article conveyor; a heated platen mounted for movement toward and away from articles on the conveyor; means for guiding a decalcomania transfer ribbon beneath the platen; a ribbon feed roll over which the decalcomania ribbon is entrained; intermittently operative drive means coupled with the platen to drive the feed roll in a step-by-step rotation in synchronism with platen movement, said drive means having a selectively operative delayed motion connection with the feed roll to momentarily delay coupling of the feed roll to the drive means during a portion of the movement of the drive means in each step of the step-by-step motion or inoperative to delay coupling; and means for sensing misregistry relative to said platen of decalcomania on the transfer ribbon, and coupled with the selectively operative delay motion connection to actuate such connection upon sensing misregistry.

10. A decalcomania transfer machine comprising: an article conveyor; a heated platen disposed above the conveyor for movement toward and away from articles on the conveyor; a feed roll about which a decalcomania ribbon is entrained for movement; means for guiding the ribbon beneath the platen; step-by-step drive means operable in synchronism with movement of articles on the conveyor to drive the feed roll in step-by-step increments of rotation; means for coupling the drive means to the feed roll to rotate the roll during each step-by-step operation of the drive means, said coupling means selectively operable to momentarily withhold driving engagement of the driving means from the feed roll during selected driving steps of the step-by-step movement of the drive means to reduce correspondingly the rotation of the feed roll; means operatively connected with the coupling means for sensing misregistry of decalcomania on the ribbon with respect to the platen and operative upon sensing misregistry to actuate said coupling means to momentarily withhold driving engagement between the driving means and the feed roll to decrease rotation of the roll during subsequent step-by-step operation of the driving means.

References Cited in the file of this patent
UNITED STATES PATENTS

| | | |
|---|---|---|
| 2,323,843 | Richter et al. | July 6, 1943 |
| 2,674,056 | Schwartz et al. | Apr. 6, 1954 |
| 2,690,104 | Schwartz et al. | Sept. 28, 1954 |